Figure 1:
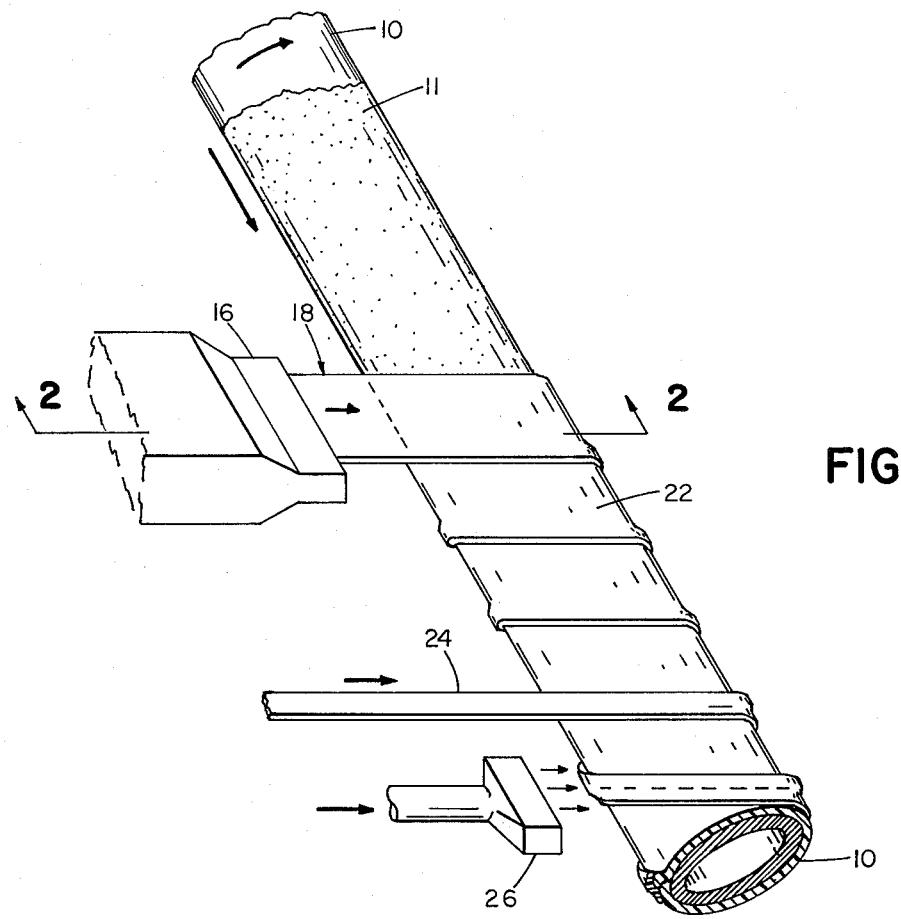

United States Patent

Samour

[11] 4,211,595
[45] Jul. 8, 1980

[54] METHOD OF COATING PIPE

[75] Inventor: Carlos M. Samour, Wellesley, Mass.

[73] Assignee: The Kendall Company, Boston, Mass.

[21] Appl. No.: 949,698

[22] Filed: Oct. 10, 1978

[51] Int. Cl.² .................. F16L 11/16; B65H 81/00; B32B 15/08

[52] U.S. Cl. .................................. 156/187; 156/190; 156/192; 156/195; 156/244.13; 156/392; 427/189; 427/195; 427/375; 427/386

[58] Field of Search .............. 156/244.13, 187, 188, 156/190, 192, 195, 392, 315; 427/189, 195, 375, 386

[56] References Cited

U.S. PATENT DOCUMENTS

| Re. 30,006 | 5/1979 | Sakayori et al. | 427/195 X |
|---|---|---|---|
| 2,820,249 | 1/1958 | Colombo | 118/302 X |
| 3,402,742 | 9/1968 | O'Brien | 156/187 X |
| 3,616,006 | 10/1971 | Landgraf et al. | 156/188 |
| 3,687,765 | 8/1972 | MacLean et al. | 156/195 X |
| 3,700,520 | 10/1972 | Hielema | 156/188 |
| 3,802,908 | 4/1974 | Emmons | 156/188 X |
| 3,823,045 | 7/1974 | Hielema | 156/188 |
| 4,026,747 | 5/1977 | Delorean et al. | 156/187 X |
| 4,078,123 | 3/1978 | Costenoble | 156/188 X |
| 4,145,243 | 3/1979 | Cottam | 156/392 |
| 4,154,876 | 5/1979 | Segawa et al. | 427/195 |

Primary Examiner—Harold Ansher

[57] ABSTRACT

Steel pipe is provided with protective coating by first applying a corrosion protective coating such as fused powdered epoxy resin or heat activated adhesive or butyl-based pressure-sensitive adhesive adhered to the pipe, then extruding or coextruding an outer polyolefin layer directly onto the corrosion protective coating. The coextrusion step may include an outer layer of high density polyethylene and an inner adherent layer of low density polyethylene, or an outer layer of polyethylene or polypropylene and an inner layer of a copolymer of ethylene or propylene and acrylic acid.

9 Claims, 2 Drawing Figures

METHOD OF COATING PIPE

This invention relates to protective coating of metal pipe particularly steel pipe for use in pipe lines for conveying gas or oil.

It has previously been proposed to apply corrosion protective coatings to metal pipe by first applying a layer of self-sealing mastic or thermoplastic adhesive or heat insulation to the pipe while the pipe is either heated or unheated, followed by extruding a band of thermoplastic material and helically wrapping it with an overlap in one or more layers over the first coating, as described in U.S. Pat. Nos. Landgraf 3,616,006, MacLean et al. 3,687,765, Emmons 3,802,908 and Hielema 3,823,045. It has also been commercial practice to apply to such metal pipe a primer coating, followed by a helical wrap of a high grade, pin-hole-free corrosion-protective band of thermoplastic together with an adhesive and a second helical wrap of thermoplastic sheet over the first to provide protection of the first wrap against mechanical abrasion or tearing, either during shipment of the pipe or during the laying or covering of it in a trench. The second helical wrap in such case has been held in place either by an overall coating of pressure-sensitive adhesive over the first helical wrap or by heat-sealing or adhesively bonding the margin of the other helical wrap to itself and/or to the underlying layer. It has also been commercial practice to apply to such pipe protective coating by heating the steel pipe and bringing the heated pipe into contact with a thermosetting resin powder such as an epoxy resin powder which adheres to the pipe surface, and thereafter further heating the pipe to sinter or fuse and cure the adhered epoxy resin particles on the pipe surface. Such coatings tend to exhibit thin spots or pinholes where sintering or fusing of the particles is incomplete. Extrusion coating of pipe has also been taught by Colombo U.S. Pat. No. 2,820,249.

It has been considered essential for effective corrosion protection to ensure that the first coating is substantially completely free from pinholes and thin spots. This has been true even in those cases in which a D.C. electrical potential has been maintained on the pipe after laying in order to provide cathodic protection against corrosion because it has been found that the presence of a pinhole usually results in generation of hydrogen gas and hydroxyl ions by electrolytic action, both of which tend to cause destruction of the adhesive bond and progressive separation of the coating from the pipe. The necessity for avoiding thin spots and pinholes in the coating has made it very difficult to employ epoxy resin powder coatings for coating pipe with fully satisfactory results even though such coatings display remarkably good adhesion to the steel pipe surface. Furthermore, in the case of a first coating made from a helical wrap of preformed sheet material, the necessity for avoiding pinholes in the corrosion protecting coating makes it important to employ only expensive prime quality thermoplastic raw material in the manufacture of the sheet material for the first wrap and greatly reduces the possibility of using less expensive scrap or second grade raw material because of the tendency of the latter to form pinholes during sheet formation.

The present invention comprises an improved method of coating by applying one of the conventional corrosion protective first layers, then providing an outer layer which effectively protects against mechanical abrasion and tearing and at the same time reduces the number of pinholes and thin spots; this result is achieved by extruding directly in sheet or tubular form onto the underlying layer a layer comprising resin, preferably comprising polyolefin such as polyethylene or polypropylene in heated, softened condition. In a preferred embodiment the extruded polyolefin layer forms a part of a coextruded composite sheet, the inner portion or layer of which comprises low density polyethylene while the outer portion or layer comprises high density polyethylene. In another preferred embodiment, the underlying layer on the pipe is formed by fusing and curing at least partially a layer of powdered epoxy resin to form a thin film corrosion protective layer and thereafter coextruding directly onto the surface of the corrosion protective layer a composite sheet, the inner portion or layer of which comprises a copolymer of ethylene and acrylic acid and the outer portion or layer of which comprises polyethylene, preferably high density polyethylene. The epoxy resin forms a strongly adherent bond to the surface of the steel pipe while the copolymer reacts chemically with the incompletely cured epoxy resin to form a strongly adherent bond thereto; the coextrusion of polyethylene with the copolymer produces a strong bond between the two coextruded layers; as a consequence, all parts of the finished coating are bonded very strongly to the surface of the steel pipe. Moreover, in each case any pinholes or thin spots in the underlying corrosion protective coating are covered by the adherent extruded or coextruded polyolefin layer; while the polyolefin layer may itself have occasional pinholes, there is little likelihood that these pinholes will match up with those in the underlying corrosion protective layer. The polyolefin layer can be extruded either in tubular form directly onto the coated pipe as the latter advances through the annular extruder die or it can be extruded in the form of a band or ribbon which is immediately and directly deposited on and helically wrapped about the coated pipe as the latter is simultaneously rotated and advanced along its axis with respect to the extruder die. The method of the present invention provides adhesion of the outer extruded (or coextruded) polyolefin to the underlying corrosion resistant coating over the complete inner surface of the outer polyolefin and decreases the cost of protecting the pipe because it makes it possible to tolerate a substantial number of pinholes in the underlying corrosion protective coating as well as in the protective thermoplastic material of the outer helical wrap itself without loss of protection or decrease in the durability of the protective coating.

The method of the present invention comprises first adhering a coating or layer of corrosion protective material to the surface procedure such as by applying a powdered epoxy coating, a heat activated adhesive coating, or a butyl based pressure-sensitive adhesive coating that is, a plastic e.g., polyethylene coating bonded to the pipe with a pressure-sensitive adhesive containing butyl rubber to the pipe surface. In the case of the powdered epoxy coating the procedure involves heating the pipe, bringing the heated pipe into contact with powdered epoxy resin to adhere particles of the resin to the pipe surface, then further heating the resin particles to fuse and at least partially cure them in place on the pipe surface. In the case of heat-activated adhesive the pipe must also be heated sufficiently so that the adhesive coating is maintained in activated condition during the subsequent extrusion application of the polyolefin layer. In the case of the butyl-based pressure-sensitive adhesive, the coating may be applied to the pipe which is at room temperature or slightly higher and maintained at that temperature.

The outer polyolefin layer is extruded or coextruded directly onto the surface of the corrosion protective material in heated and softened form either in the form of a tube enveloping the coating pipe while advancing the latter with respect to the die, or in the form of a band while simultaneously rotating the coated pipe about its axis and advancing it along its axis to wrap the band helically about the pipe. When the outer polyolefin layer is coextruded in the form of a composite band or sheet having at one face an outer layer or layers of tough tear-resistant and abrasion-resistant protective non-adhesive thermoplastic material and at the inner face at least one layer of thermoplastic adhesive material, the coextruded composite sheet is wrapped helically upon the pipe previously coated with a corrosion protective material, with the lateral margins of the composite sheet preferably overlapping, while the inner adhesive layer is in heat-softened condition. By coextrusion is meant the well-known process of simultaneous extrusion of two or more different thermoplastics into a multi-layered composite sheet as described, for example, in TAPPI MONOGRAPH REPORT NO. CA-43, Chapter 6 (1973). The composite sheet is formed either immediately before or immediately after (within a fraction of an inch) coextrusion from the die orifice. Because of the intimate contact of the two molten coextruded layers of the composite sheet with each other throughout the extent of their interfacial contact surface, the bond between the two is very strong. Furthermore, because the continuous layer of thermoplastic adhesive after application of the composite sheet to the underlying corrosion protective coating effectively isolates any pinholes in the latter, occasional pinholes can be tolerated both in the underlying corrosion resistant coating and in the second or outer protective helical wrap as well because the likelihood of aligning pinholes in the two separately applied helical wraps is very remote. The method of the present invention therefore provides not only improved protection of the corrosion resistant coating against abrasion or tearing, but it makes it possible to reduce the cost of the corrosion resistant coating as well by eliminating or restricting the bad effects hitherto resulting from the presence of pinholes in the underlying corrosion protective resistant coating. It also makes it possible to obtain a well bonded outerwrap without regard to the nature of the inner corrosion protective layer.

The temperature of the pipe during application of the initial corrosion protective coating depends largely upon the nature of the coating as pointed out above. When the corrosion protective coating is powdered epoxy resin, the pipe must be preheated to a temperature sufficiently high, of the order of 300° to 600° F., to cause the epoxy resin to wet and coat the pipe throughout its surface, by fusion of the powder particles of the coating, and then to cure the coating. The corrosion protective coating preferably has a thickness of 2 to 10 mils and is cured within 1 to 4 minutes. Suitable epoxy compositions are well known in the art being described for example in U.S. Pat. No. 4,060,655. When the corrosion protective coating does not require heating to bond it to the pipe or to cause it to cure, the pipe may be at the temperature of the ambient atmosphere provided it is free from condensed moisture and is clean.

Figure 2:
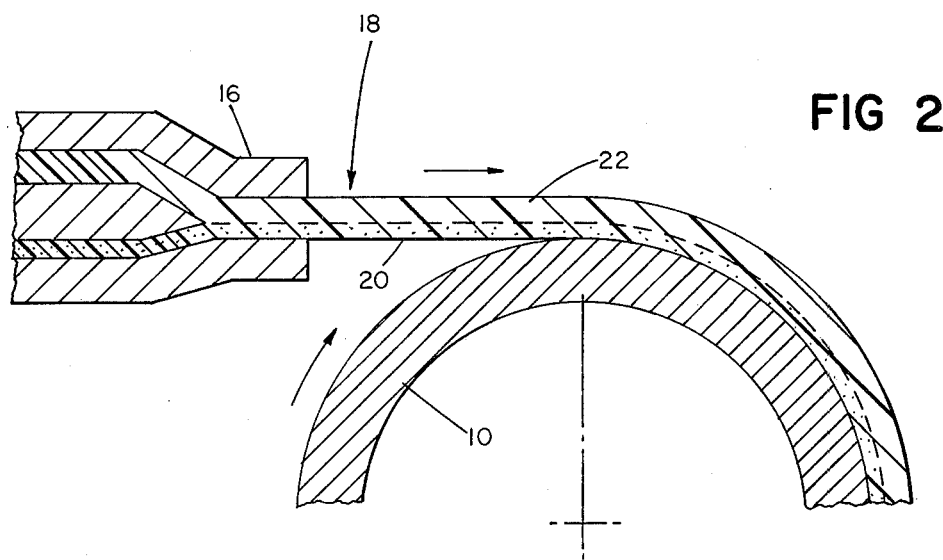

In the appended drawings,
FIG. 1 is a schematic isometric representation of one embodiment of the present invention, and
FIG. 2 is a view in section taken along line 2—2 of FIG. 1.

As shown in FIG. 1 of the drawing, pipe 10 which has first been coated with a corrosion protective layer 11 and dried. Lower quality coatings having occasional pinholes can be used for layer 11 than has heretofore been the case without loss of the quality of protection of the finished pipe. In one embodiment, the corrosion protective coating 11 consists of epoxy resin powder and is electrostatically applied to the pipe after preheating the latter to a temperature at least 25° F. above the melting point of the epoxy resin powder to cause it to fuse and wet the pipe within 5 to 35 seconds, followed by curing within a total time of 1 to 4 minutes. When the subsequently applied coating includes a layer of ethylene-acrylic acid copolymer, as described below, the epoxy resin coating 11 is preferably only partially cured to enhance subsequent chemical reaction with and bonding of the epoxy resin to the copolymer.

Following application of the corrosion protective coating, the coated pipe is advanced axially past extruder die 16 and simultaneously rotated while there is coextruded through die 16 a band or composite sheet 18 having at its lower or inner surface at least one layer comprising adhesive 20 and at its upper or outer surface at least one layer comprising heat softened polyolefin 22 to form a protective outer sheath. The coextruded band 18 is wrapped helically directly on the outer surface of layer 11 of the coated pipe with a small marginal overlap of band 18 as shown. Because the adhesive layer 20 remains hot and relatively fluid as it passes directly from extrusion die 16 to its contact with the coated pipe, and because the area of the adhesive layer is coextensive with the area of the outer polyolefin layer 22, uniform and complete adhesion throughout the area of interfacial contact between band 16 and layer 11 on coated pipe 10 is achieved, thus at the same time sealing and isolating any pinholes in coating 11 when the latter is formed from powdered epoxy resin, for example. After cooling of the pipe, the coating includes corrosion protective coating 11 adhered to the pipe and outer composite sheet 18 adhered to the entire outer surface of the corrosion protective coating. It is essential for best results that the rate of extrusion and the rate of rotation and advance of the pipe be adjusted to each other so that dimensions of the composite sheet 18 and the tension under which it is applied to the pipe carrying corrosion protective coating be maintained substantially uniform. The tension should preferably be maintained as high as possible to ensure complete contact of the heat softened thermoplastic adhesive layer 20 with the outer surface of corrosion protective layer 11 despite any irregularities in the latter.

The adhesive may be any of those compositions conventionally employed for adhesion to metal or plastic surfaces and may be a single material or a mixture of two or more different materials; among suitable materials are butyl based adhesives, propylene-acrylic acid copolymer, an ethylene-acrylic acid copolymer, ethylene acrylate or vinyl acetate copolymer. The outer protective polyolefin layer may be any conventional tough and tear resistant polyolefin which is heat softenable and extrudable in the same range of temperatures as the thermoplastic adhesive; polyolefins such as medium and high density polyethylene and high impact polypropylene (containing rubbery ethylene-propylene copolymer) are preferred. The thickness or gauge of the composite sheet 18 can be varied at will from about 7 mils to about 120 mils of which the thickness of the thermoplastic adhesive layer may vary from 2 to 25 mils and the thickness of the protective thermoplastic layer from 5 to 118 mils. Preferably the thickness of the adhesive layer is no more than half the total thickness of the composite sheet, usually from 5 to 30% of the total thickness, depending on the total thickness of the composite sheet which in turn varies depending on pipe diameter and the extent of impact resistance desired.

In the case in which the corrosion protective layer 11 consists of heat-activated adhesive or of butyl-based pressure-sensitive adhesive coating which is pressure sensitive, the outer protective polyolefin layer may be extruded alone, without coextrusion of an adhesive layer, so that composite sheet 18 is replaced by a homogeneous sheet of polyolefin. In the case in which the corrosion protective layer 11 consists of fused and cured epoxy resin powder, the coextruded adhesive layer preferably comprises a copolymer of ethylene or propylene with acrylic acid, which copolymer interacts with the epoxy resin, particularly when the latter is incompletely cured at the time of coextrusion of the adhesive.

In the case of a butt seam, in order to ensure sealing of the seam, it is also possible as an optional feature to apply over the helical seam formed by composite sheet 18, either lapped seam or butt seam, as an additional step a ribbon or tape 24 comprising a heat shrinkable thermoplastic material such as oriented polyethylene or polypropylene containing rubber such as ethylene-propylene rubber or the like. A heat source 26 such as an infrared heater or a flame is provided to heat the tape after it has been applied to cause it to shrink about the coated pipe along the seam. The coated pipe may be cooled to room temperature before or after applying and shrinking tape 24 in place. Ribbon or tape 24 may also be a molten extrusion of the same composition as the outer coating layer 22, in which case heat source 26 can be omitted.

What is claimed is:

1. A method of coating pipe which comprises the steps of adhering a layer of corrosion protective material to the surface of the pipe to form a cooling thereon, and extruding directly onto said coating a layer comprising polyolefin in overlapping spiral wrapping to form a protective outer sheath over said coating.

2. A method as claimed in claim 1 in which the step of adhering a layer of corrosion protective material to the surface of said pipe comprises depositing a layer of powdered epoxy resin upon the surface of said pipe and heating said pipe to fuse and cure said layer.

3. A method as claimed in claim 1 in which the step of adhering a layer of corrosion protective material to the surface of said pipe comprises depositing a butyl based pressure sensitive adhesive coating upon the surface of said pipe.

4. A method as claimed in claim 1 in which the step of adhering a layer of corrosion protective material to the surface of said pipe comprises depositing a layer of heat activatable adhesive on the surface of said pipe and heating said pipe to activate said adhesive.

5. A method as claimed in claim 2 in which said extruding step comprises coextruding a composite sheet having at its inner surface at least one layer comprising adhesive and at its outer surface at least one layer comprising polyolefin.

6. A method as claimed in claim 5 in which said coextruded adhesive layer comprises a copolymer of ethylene or propylene with acrylic acid.

7. A method as claimed in claim 3 or 4 in which the layer comprising polyolefin is a homogeneous layer of polyolefin.

8. A method as claimed in claim 1 in which the step of extruding a polyolefin comprises coextruding a composite sheet having an inner portion comprising low density polyethylene and an outer portion comprising high density polyethylene.

9. A method as claimed in claim 3 or 4 in which the step of extruding a polyolefin comprises coextruding a composite sheet having an inner portion comprising low density polyethylene and an outer portion comprising high density polyethylene.

* * * * *

UNITED STATES PATENT AND TRADEMARK OFFICE
CERTIFICATE OF CORRECTION

PATENT NO. : 4,211,595
DATED : July 8, 1980
INVENTOR(S) : Carlos M. Samour

It is certified that error appears in the above–identified patent and that said Letters Patent are hereby corrected as shown below:

Column 1, line 27, "other" should be --outer--;

Column 6, line 3, "cooling" should be --coating--.

Signed and Sealed this

Twenty-eighth Day of October 1980

[SEAL]

Attest:

SIDNEY A. DIAMOND

Attesting Officer

Commissioner of Patents and Trademarks